UNITED STATES PATENT OFFICE 2,406,186

MANUFACTURE OF SURFACE-ACTIVE COMPOUNDS

Alfred William Baldwin, Noel William Cusa, and Henry Worthington, Blackley, Manchester, England, assignors to Imperial Chemical Industries Limited, a corporation of Great Britain No Drawing. Application January 14, 1943, Serial No. 472,388. In Great Britain January 30, 1942

9 Claims. (Cl. 260—561)

This invention relates to the manufacture of new surface-active compounds. More particularly it relates to the manufacture of new surface-active condensation products of primary or secondary amines with particular 2,5-diketooxazolidines of the kind hereinafter specified.

We have now found that new surface-active compounds, useful as wetting agents, detergents, softening agents, emulsifying or dispersing agents are obtained by causing a primary or secondary amine to interact with one or more molecular proportions of a 2,5-diketooxazolidine of the formula $$\begin{array}{c} \text{RN—CO—O} \\ | \quad\quad\quad | \\ \text{R'CH——CO} \end{array}$$

wherein R and R' may each be a hydrogen atom or one of them, but not both, may be a methyl group.

The 2,5 diketooxazolidines which are used as starting materials may themselves be made by causing an α-aminocarboxylic acid of the formula RNH—R'CH—COOH to react with a chloroformic ester ClCOOX, whereby the compound XOCO—NR—R'CH—COOH is formed, or by esterifying the said acid and then treating it with carbon dioxide in the cold (in the manner described in Nature, 1939, vol 144, p. 832) whereby the compound XOCO—R'CH—NR—COOH is formed, the said compound

XOCO—NR—R'CH—COOH or XOCO—R'CH—NR—COOH being then treated with an agent adapted to convert a carboxylic acid into the corresponding carboxylic halide, for example, a phosphorus halide or oxyhalide, phosgene or thionyl chloride, followed by heating to effect ring closure and elimination of the halide X-Hal. In these formulae X stands for an alkyl, cycloalkyl or aralkyl radical.

The α-amino acids from which may be derived the 2,5 diketooxazolidines which are to be used as starting materials for this invention are therefore glycine, sarcosine and alanine. Oxazolidines derived from mixtures of these α-amino acids may also be used.

As suitable primary or secondary amines to be combined with the 2,5-diketooxazolidines there may be mentioned, for example, octadecylamine, n-butylamine, N-methylcetylamine, cyclohexylamine, β-naphthylamine and piperidine.

The reaction of the oxazolidine with the amine is brought about by heating them together, optionally in presence of an organic solvent, at such a temperature that carbon dioxide is evolved at a controllable rate. The optimum temperature depends on the particular oxazolidine and amine used. In practice it is convenient to heat the amine (together with the solvent, if one is used) and to add the oxazolidine gradually making each subsequent addition when the evolution of carbon dioxide has slackened off.

It is believed that the reaction of equimolecular proportions of amine and oxazolidine can be represented, using a primary amine $ANH_2$ for illustration, by the equation

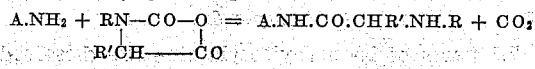

When more than one molecular proportion of oxazolidine is used the reaction is believed to be

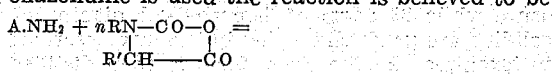

$A.NH.CO.CHR'NR(CO.CHR'.NR)_{n-1}H + nCO_2$

The following examples illustrate, but do not limit, the invention. The parts are by weight.

Example 1

26.9 parts of octadecylamine are dissolved at 45–50° C. in 200 parts of dry benzene and the solution is stirred and kept at that temperature while 11.5 parts of 3-methyl-2,5-diketooxazolidine are gradually added in portions, each successive evolution of carbon dioxide being allowed to cease before the next addition is made. The benzene is then removed by distillation, first at atmospheric pressure and finally under sub-atmospheric pressure at 100° C. There remains a pale yellow waxy solid which is only slightly soluble in hot water but completely soluble in dilute aqueous hydrochloric acid, forming a clear foaming solution.

Example 2

To 26.9 parts of octadecylamine dissolved in 500 parts of dry benzene at 45–50° C. there are added 57.5 parts of 3-methyl-2,5-diketooxazolidine, the addition being made gradually in the way described in Example 1. The benzene is then distilled off, first at atmospheric pressure and then under sub-atmospheric pressure, whereupon there remains a pale yellow, slightly hygroscopic, powder, which dissolves in hot water forming a clear foaming solution.

Example 3

34.5 parts of 3-methyl-2,5-diketooxazolidine are added to a solution of 5.38 parts of octadecylamine in 400 parts of dry benzene at 45–50° C. in the way described in Example 1. The benzene is then distilled off, first at atmospheric pressure and then under sub-atmospheric pressure, whereby there is obtained a cream-coloured powder which dissolves in cold water, forming a clear foaming solution.

Example 4

5.38 parts of octadecylamine are dissolved in 1600 parts of dry chloroform at 45–50° C. To this solution there are added 69 parts of 3-methyl-2,5-diketooxazolidine in the manner described in Example 1. The chloroform is distilled off, first at atmospheric pressure and then under sub-atmospheric pressure whereby there is obtained a light brown brittle powder which is easily soluble in cold water forming a clear foaming solution.

Example 5

To a solution of 7.3 parts of n-butylamine in 750 parts of dry chloroform at 45–50° C., 57.5 parts of 3-methyl-2,5-diketooxazolidine are gradually added in the manner described in Example 1. The chloroform is then distilled off, first at atmospheric pressure and then under sub-atmospheric pressure, whereby there is obtained a light brown, hygroscopic, sticky solid which dissolves easily in cold water, forming a clear solution which foams slightly on shaking.

Example 6

7.1 parts of N-methylcetylamine are dissolved at 45–50° C. in 600 parts of dry chloroform and the solution is stirred and kept at that temperature while 23 parts of 3-methyl-2,5-diketooxazolidine are gradually added in the way described in Example 1. The chloroform is then distilled off first at atmospheric pressure and then under sub-atmospheric pressure, whereby there is obtained an orange brittle powder which dissolves in cold water, forming a clear foaming solution.

Example 7

To a solution of 3.5 parts of cyclohexylamine in 750 parts of dry chloroform at 45–50° C. there are gradually added, in the way described in Example 1, 57.5 parts of 3-methyl-2,5-diketooxazolidine. The chloroform is then distilled off first at atmospheric pressure and then under sub-atmospheric pressure. There is thus obtained a pale brownish-yellow, hygroscopic powder which easily dissolves in cold water forming a clear slightly foaming solution.

Example 8

57.5 parts of 3-methyl-2,5-diketooxazolidine are added to a solution of 7.15 parts of β-naphthylamine in 750 parts of dry chloroform at 45–50° C., the addition being made gradually in the way described in Example 1. The chloroform is then distilled off, first at atmospheric pressure and then under sub-atmospheric pressure whereby there is obtained a cream-coloured brittle powder which dissolves in hot water, forming a clear solution.

Example 9

To 17 parts of piperidine dissolved in 400 parts of dry chloroform at 45–50° C. there are added 115 parts of 3-methyl-2,5-diketooxazolidine, the addition being made in the way described in Example 1. The chloroform is then distilled off first at atmospheric pressure and then under sub-atmospheric pressure. There is thus obtained a yellow hygroscopic brittle resin which easily dissolves in cold water, forming a clear solution.

Example 10

7 parts of octadecylamine are dissolved in 250 parts of dry chloroform at 58–60° C. 15 parts of 4-methyl-2,5-diketooxazolidine are added in portions, as described in Example 1. The chloroform is then distilled off under sub-atmospheric pressure. There is thus obtained a cream coloured waxy solid, which is soluble in hot water to give a clear foaming solution.

Example 11

15 parts of 4-methyl-2,5-diketooxazolidine are added in portions, in the manner described in Example 1 and at a temperature of 40° C., to a solution of 3.5 parts of octadecylamine dissolved in 90 parts of chloroform. When the evolution of carbon dioxide is complete, the chloroform is distilled off under sub-atmospheric pressure. The residue is then washed with ether, whereby there is obtained a cream coloured waxy solid which is soluble in cold water to give a clear foaming solution.

Example 12

4.6 parts of octadecylamine are dissolved in 60 parts of dry benzene, and 17.5 parts of 2,5-diketooxazolidine are added. The mixture is refluxed for 12 hours. The benzene is then distilled off under sub-atmospheric pressure, whereby a cream coloured brittle solid is obtained. This is partially soluble in hot water to give a hazy foaming solution.

Example 13

To 4.6 parts of N-cetylmethylamine dissolved in 80 parts of dry acetone at 45–50° C., 18.5 parts of 2,5-diketooxazolidine are gradually added in the manner described in Example 1. The acetone is then distilled off under sub-atmospheric pressure whereby there is obtained a pale brown solid which dissolves in hot or cold water, forming slightly hazy solutions which foam when shaken.

It will be apparent to one skilled in the art that it is possible, without departing from the spirit and scope thereof, to devise embodiments of this invention other than those set forth in the above examples, and accordingly it is to be understood that the invention is not limited to the particular embodiments therein described, but only as defined in the following claims.

We claim:

1. Process for the manufacture of surface-active compounds which comprises gradually adding a 2,5-diketooxazolidine of the formula

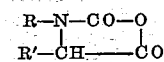

wherein one of R and R' is hydrogen and the other is selected from the class consisting of hydrogen and methyl to a solution, in an inert organic solvent, of a monoamine having hydrogen on the amino nitrogen and having the remaining valences of the nitrogen satisfied by hydrocarbon, the solution being heated to a temperature sufficient to cause evolution of carbon dioxide on addition of the diketooxazolidine and the diketooxazolidine being added as evolution of carbon dioxide slackens and until at least one mol, per mol of amine, has been added, and removing the solvent by distillation.

2. Process for the manufacture of surface-active compounds which comprises gradually adding 3-methyl-2,5-diketooxazolidine to a solution, in an inert organic solvent, of a primary alkylamine, the solution being heated to a temperature sufficient to cause evolution of carbon dioxide on addition of the diketooxazolidine and the diketooxazolidine being added as evolution of carbon dioxide slackens and until at least one mol, per mol of amine, has been added, and removing the solvent by distillation.

3. The process for the manufacture of surface-active compounds which comprises gradually adding a 2,5-diketooxazolidine of the formula

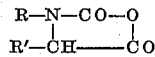

wherein one of R and R' is hydrogen and the other is selected from the class consisting of hydrogen and methyl to a solution, in an inert organic solvent, of cetylamine, the solution being heated to a temperature sufficient to cause evolution of carbon dioxide on addition of the diketooxazolidine and the diketooxazolidine being added as evolution of carbon dioxide slackens and until at least one mol, per mol of amine, has been added, and removing the solvent by distillation.

4. Process for the manufacture of surface-active compounds which comprises gradually adding a 2,5-diketooxazolidine of the formula

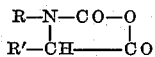

wherein one of R and R' is hydrogen and the other is selected from the class conisting of hydrogen and methyl to a solution, in an inert organic solvent, of octadecylamine, the solution being heated to a temperature sufficient to cause evolution of carbon dioxide on addition of the diketooxazolidine and the diketooxazolidine being added as evolution of carbon dioxide slackens and until at least one mol, per mol of amine, has been added, and removing the solvent by distillation.

5. Compounds of the formula $$AR^2N(—CO—CHR'—NR)_nH$$

wherein $n$ is an integer from 1 to 30, $R^2$ is hydrocarbon, A is selected from the class consisting of hydrogen and hydrocarbon, one of R and R' is hydrogen and the other is selected from the class consisting of hydrogen and methyl.

6. Compounds of the formula $$AR^2N(—CO—CH_2—N(CH_3)—)_nH$$

wherein $n$ is an integer from 1 to 30, $R^2$ is hydrocarbon, A is selected from the class consisting of hydrogen and hydrocarbon.

7. Compounds of the formula $$R^2HN(—CO—CH_2—N(CH_3)—)_nH$$

wherein $n$ is an integer from 1 to 30 and $R^2$ is alkyl.

8. Compounds of the formula $$C_{18}H_{37}—NH(—CO—CH_2—N(CH_3)—)_nH$$

wherein $n$ is an integer from 1 to 30.

9. A compound having a chain containing from one to 30 units of the formula $$—CO—CHR'—NR—$$

wherein one of R and R' is hydrogen and the other is selected from the class consisting of hydrogen and methyl, the terminal valence of the chain stemming from the CO is satisfied by a monovalent radical and the terminal valence of the chain stemming from NR is satisfied by hydrogen.

ALFRED WILLIAM BALDWIN.
NOEL WILLIAM CUSA.
HENRY WORTHINGTON.